May 18, 1954.　　　　P. J. GURIN　　　　2,678,660
FLAPPER VALVE FOR FUEL TANKS
Filed Oct. 31, 1952
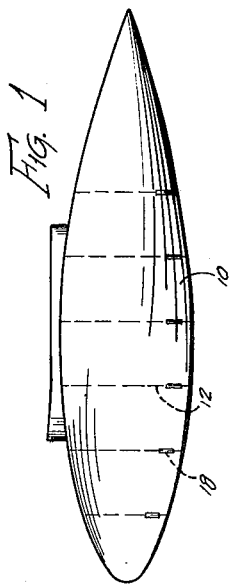
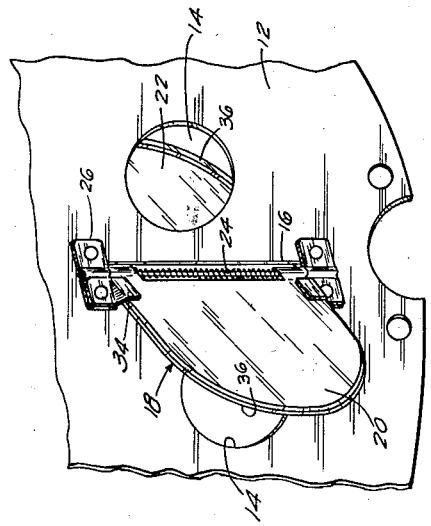
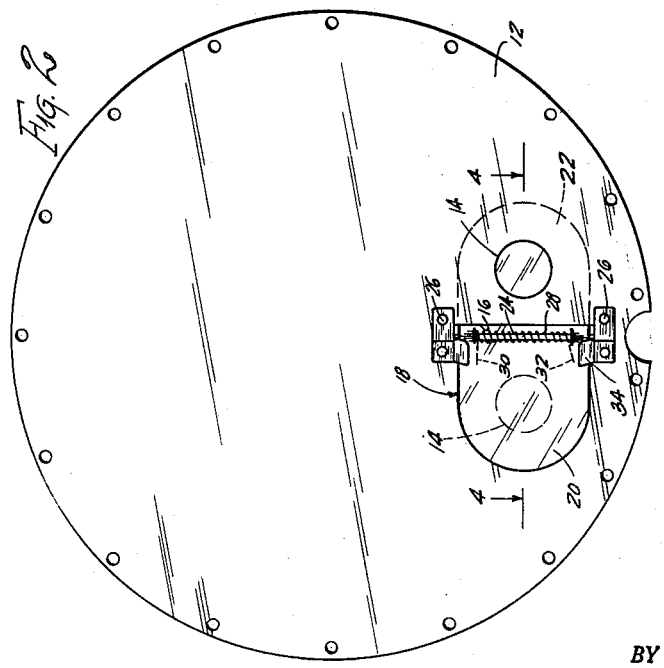
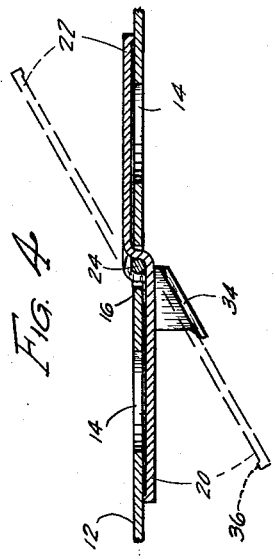
INVENTOR.
PETER J. GURIN
BY
H. H. Gearinger
ATTORNEYS

Patented May 18, 1954

2,678,660

UNITED STATES PATENT OFFICE 2,678,660

FLAPPER VALVE FOR FUEL TANKS

Peter J. Gurin, Ardmore, Pa.

Application October 31, 1952, Serial No. 318,149

7 Claims. (Cl. 137—576)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in tanks for preventing the surging of fluid content therein and particularly to improvements in flapper valve assemblies for preventing such fluid motion and the resulting displacement in weight caused thereby.

Although not limited to such use, the present invention has special application to aircraft fuel tanks and particularly auxiliary fuel tanks carried on the wings or at other locations remote from the center of gravity of the aircraft. In such locations the fuel content of the tanks will shift rapidly when the aircraft changes course in flight and will change the center of gravity not only of the tank but also that of the aircraft. This sudden shift in liquid content will impose additional strains on the aircraft structure as well as affect the desired maneuver being performed.

In the past relatively expensive and complicated valving devices have been employed for preventing liquid movement under such circumstances. One such valve assembly required two independently movable valve members on opposite sides of a baffle wall in order to be responsive to surging movement of the liquid content in opposite directions in the tank.

An important object of the invention is to provide an improved flapper valve assembly for the purpose of preventing surging of liquid contents of tanks and the like which is simple in design, composed of few parts inexpensive to fabricate and assemble and is sensitive to surging liquid pressure in either direction in the tank.

Another important object of the invention is to provide a flapper valve assembly for use in aircraft fuel tanks which is comparatively light in weight and easy to operate.

A further important object of the invention is to provide a valve assembly of this character which is designed in a novel manner so that one movable member thereof is capable of valving the tank regardless of which direction the surging motion is in the tank.

Other objects and many of the attendant advantages of this invention will be readily appreciated as the same becomes better understood by reference to the following detailed description when considered in connection with the accompanying drawings wherein:

Fig. 1 is a side elevation of an aircraft fuel tank showing the division thereof into separate compartments, Fig. 2 is a perspective view of one of the dividing walls of the fuel tank of Fig. 1 and showing the valve mechanism in closed position, Fig. 3 is a perspective view similar to Fig. 2 but showing the valve mechanism in opened position, and Fig. 4 is a cross sectional view taken along line 4—4 of Fig. 2.

The invention is shown as applied to an aircraft auxiliary fuel tank but it is understood that the invention may be used in other environments. Referring to the drawing, Fig. 1 illustrates an auxiliary fuel tank 10 which is adapted to be suspended under the wing of an aircraft. The tank is elongated in one dimension as shown and is interiorly divided into a number of compartments spaced longitudinally therealong. Each compartment is separated from one another by a baffle plate or partition wall shown in dotted outline at 12. The present invention relates to the provision of a valving mechanism in each partition wall for preventing the surging of liquid content in the tank and at the same time maintaining the content at a common level in each compartment.

Referring particularly to Figs. 2 and 3, one such baffle plate or wall 12 is shown in enlarged scale. The wall is provided with a ported area usually located adjacent to the bottom of the tank so that it will permit flow of liquid between the compartments at practically all of the levels therein. In the illustrated embodiment of the invention the ported area comprises two spaced apart openings or ports 14—14 which are located adjacent to one another preferably in a horizontal plane. The baffle plate is further provided with an elongated slot 16 which is located between the two ports and which preferably extends as shown crosswise to a line between the centers of the ports.

Valve means of the present invention comprises a single member 18 which as shown is preferably formed of sheet metal stock and having a relatively flat expanse more than sufficient to overlie the two ported areas 14—14. The valve member is proportioned to fit through the slot 16 and is normally positioned with its mid section in the slot so that one end section 20 of the valve member is located on one side of the baffle plate and the opposite end section 22 is located on the other side of the baffle plate.

The valve member 18 is mounted for pivotal movement on an axis lying substantially in the plane of the baffle plate 12 and extending between the two ported areas. The hinge means for this purpose comprises a rod or pintle 24 lying in the slot 16 and having its opposite ends secured to the baffle plate. Suitable brackets 26—26 are secured to the baffle plate at the opposite ends of the slot 16 and cooperate with an indentation formed in the wall 12 to receive and support the opposite ends of the rod 24. The baffle member is secured to the rod in the manner shown in Fig. 4 by deforming its mid section on one side and then on the other side of the rod. The valve member is thus free to swing on the hinge pintle between a closed position in which its end sections closely overlie the ported area as shown on Fig. 2 to an open position extending at an inclination of the plane of the baffle wall as shown in Fig. 3.

The valve member is yieldingly urged to the open position. This may be accomplished by encircling the rod 24 with a light coiled spring 28 of which one extremity 30 bears against the valve member and the opposite extremity 32 bears against the baffle plate. The coiled spring is so mounted on the rod that its tension is exerted through its extremities to urge the opposite ends of the valve member away from the baffle plate.

The extent of the outward swinging movement of the valve member is limited to an angle acute to the plane of the baffle plate in order to cause the valve member to move toward closed position in response to any surging pressure of the liquid content of the tank. Stop means is provided for limiting the extent of opening movement to a desired angle of approximately 30°. Such stop means may be in the form of ears 34—34 positioned at the opposite ends of the hinge rod 24. Preferably each ear 34 is a short strip of metal secured at one end to the adjacent bracket 26 and twisted in its mid section so that its other end lies in the path of movement of the valve member and at the desired angle to form a flat faced abutment against which the member will strike.

In the auxiliary aircraft fuel tank shown in Fig. 1, each baffle wall 12 has a valve mechanism of the kind described. Normally, these valve mechanisms are opened so that the compartments in the tank are in communication with one another. In the event, however, of a relatively rapid change in direction of the aircraft, the surging pressure of the liquid content in the tank toward one or the other end of the tank will overcome the resistance of the springs 28 and move the flapper valves to closed position. Actually the fluid pressure acts on both end sections of each flapper valve, but since the liquid pressure in one instance acts directly on all of the surface area of one side of one end section and in the other instance acts through one of the ported areas 14 on the other end section, the resulting differential pressure is sufficient to overcome the spring 28 and cause the valve to swing to closed position.

In certain conditions a surface tension adhesion might act to hold the flapper valve in closed position after the surging pressure has discontinued. To prevent such an occurrence it is desirable to provide a projection on one or both end sections of the flapper valve which extend toward the partition wall and are adapted to abut the same to slightly space the end sections from the wall in the closed position of the valve mechanism. Such a projection may be a flange 36 on the outer edge of one or both end sections of the flapper valve.

Obviously many modifications and variations of the present invention are possible in the light of the above teachings. It is therefore to be understood that within the scope of the appended claims the invention may be practiced otherwise than as specifically described.

What is claimed is:

1. In a tank adapted to contain a liquid content, a wall in the tank dividing the interior thereof into two compartments on opposite sides of the wall, said wall provided with a pair of adjacent ports therethrough permitting the free flow of the liquid content from one compartment to the other compartment, and means for preventing surging of the liquid content from one compartment to the other through said ports comprising a single relatively flat member of a size to simultaneously cover both ports to close the same, and means pivotally mounting the mid-section of the member to the wall between said ports and so disposing the member that one end section thereof lies on one side of the wall and the opposite end section thereof lies on the other side of the wall, and means for urging the said end sections of the member away from the wall such that the ports formed therein are normally in an open condition.

2. In a tank adapted to contain a liquid content, a partition wall extending across the tank and containing a pair of openings adjacent one another through which the liquid content flows, a flapper valve for preventing the surging of the liquid content through said openings comprising a thin member of relatively flat expanse and of a size to simultaneously cover both of said openings to close the same, a hinge pintle carried by the member about which it swings, means mounting the hinge pintle in the partition wall between said openings such that one end section of the valve member lies on one side of the plane of the wall and the opposite end section of the member lies on the other side of the plane of the wall in position to overlie the openings when the member has swung thereagainst, and means operatively interposed between the valve member and the partition wall and yieldingly urging the member away from the wall to normally maintain the member in opened condition.

3. In a tank for use on aircraft or other form of vehicle, a partition wall dividing the interior of the tank into two compartments on opposite sides of the wall and provided with a pair of adjacent ports therethrough for the passage of liquid content from one compartment to the other, and valve means for preventing surging of the liquid content through said ports when the tank is subjected to a change in direction of its bodily movement, said valve means comprising a single member of relatively flat expanse and of a size to simultaneously cover both ports to close the same, means pivotally mounting the mid-section of the member to the partition wall between said ports and with the pivotal axis lying substantially in the plane of the wall so that the opposite end sections of the member lie on opposite sides of the wall, and spring means yieldingly urging the member in the direction away from the plane of the wall to normally maintain the ports in open condition.

4. In a tank adapted to contain a liquid content, a partition wall extending across the interior of the tank and forming a compartment on either side of the wall, said wall provided with a ported area through which the liquid content may flow to maintain the content at a common level in the tank, means for preventing surging of the liquid content through said ported area comprising hinge means mounted on the wall substantially in the plane thereof and with the hinge axis extending across the ported area substantially midway between the opposite ends thereof, a single valve member of relatively flat expanse and of a size approximating that of the ported area, said valve member having its mid-section mounted on the hinge means for pivotal movement so that one end section of the member lies on one side of the wall and the opposite end section lies on the other side of the wall, said valve member being responsive to the surging pressure of the liquid content in one direction or the other in the tank to swing on the hinge means and bring the end sections of the member against the wall to substantially close the ported area, and means operatively interposed between the valve member and the partition wall and normally yieldingly spacing the end sections of the member away from the wall.

5. The invention described in claim 4 characterized by the provision of a projection on at least one end section of the valve member directed toward the partition wall and engaging the wall to prevent the end section from lying flat against the wall in valve closing position.

6. A flapper valve assembly including, in combination, a baffle wall member having a ported area, hinge means mounted on the wall member with the hinge axis disposed substantially in the plane thereof and across the ported area substantially midway between opposite ends thereof, a valve for closing the ported area constituted by a single relatively flat plate-like member of a size approximating that of the ported area, said valve member having its mid-section mounted on the hinge means so that one end section of the valve member lies on one side of the wall member and the opposite end section of the valve member lies on the other side of the wall member, said valve member being swingable on the hinge axis either toward or away from the plane of the wall member and adapted in one position to lie substantially flush against the wall member to close the ported area, spring means operatively interposed between the valve member and the wall member and yieldingly urging the valve member outwardly away from said flush position to normally maintain the ported area in open condition, and means carried by one of said members and arranged for abutting engagement with the other member to limit the outward swing of the valve member to an acute angle.

7. In a tubular body, a transversely extending wall member having a ported area providing flow of fluid therethrough, hinge means mounted on the wall member and disposing the hinge axis substantially in the plane of the wall member and across the ported area substantially midway between opposite ends thereof, valve means for preventing surging of fluid through the body in either direction, said valve means comprising a single relatively flat plate-like member of a size approximating that of the ported area, said valve member having its mid-section mounted on said hinge means so that one end section of the valve member lies on one side of the wall member and the opposite end section of the valve member lies on the other side of the wall member, said valve member being swingable on the hinge axis and responsive to pressure of surging fluid in either direction to swing the end sections substantially flush against the wall member to close the ported area thereof, and spring means operatively interposed between the valve member and the wall member and yieldingly urging the valve member to swing in the direction to move its end sections away from the wall member to normally maintain the ported area in open condition.

References Cited in the file of this patent

UNITED STATES PATENTS

| Number | Name | Date |
|--------|------|------|
| 765,796 | Smith | July 26, 1904 |
| 813,188 | Whitham | Feb. 20, 1906 |
| 1,973,842 | Broderick | Sept. 18, 1934 |
| 2,010,694 | Jones | Aug. 6, 1935 |